US012589495B2

(12) United States Patent (10) Patent No.: US 12,589,495 B2

Gu et al. (45) Date of Patent: Mar. 31, 2026

(54) METHOD FOR DETERMINING POSE OF ROBOT, ROBOT AND COMPUTER-READABLE STORAGE MEDIUM

(71) Applicant: UBTECH ROBOTICS CORP LTD, Shenzhen (CN)

(72) Inventors: Yulong Gu, Shenzhen (CN); Youjun Xiong, Shenzhen (CN); Simin Zhang, Shenzhen (CN); Yun Zhao, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 186 days.

(21) Appl. No.: 18/395,309

(22) Filed: Dec. 22, 2023

(65) Prior Publication Data

US 2024/0286282 A1 Aug. 29, 2024

Related U.S. Application Data

(63) Continuation of application No. PCT/CN2021/126715, filed on Oct. 27, 2021.

(30) Foreign Application Priority Data

Jun. 25, 2021 (CN) .......................... 202110709447.6

(51) Int. Cl.
*B25J 9/16* (2006.01)
*B25J 19/02* (2006.01)

(52) U.S. Cl.
CPC ............. *B25J 9/1661* (2013.01); *B25J 9/161* (2013.01); *B25J 9/1653* (2013.01); *B25J 19/022* (2013.01)

(58) Field of Classification Search
None
See application file for complete search history.

(56) References Cited

U.S. PATENT DOCUMENTS

2020/0271787 A1* 8/2020 You ........................ G01S 7/4913
2021/0247775 A1* 8/2021 Cen ........................ B25J 9/1664
2022/0198688 A1* 6/2022 Xiao ...................... G05D 1/0274

FOREIGN PATENT DOCUMENTS

CN 105953798 A 9/2016
CN 110900602 A 3/2020

OTHER PUBLICATIONS

ISR for PCT/CN2021/126715.
Written opinion of ISA for PCT/CN2021/126715.

* cited by examiner

*Primary Examiner* — Arslan Azhar

(57) ABSTRACT

A method for determining a pose of a robot having a lidar including: obtaining a first pose of the robot in a map coordinate system; determining first positions of laser points corresponding to the lidar in the map coordinate system according to the first pose when the lidar performs laser scanning; determining matching scores between the first positions and grids where the first positions are located according to the first positions and mean values of the grids where the first positions are located, wherein the grids are grids in a probability map corresponding to the map coordinate system; determining a first confidence level for the first pose based on the matching scores; and determining a target pose according to the first confidence level.

20 Claims, 4 Drawing Sheets

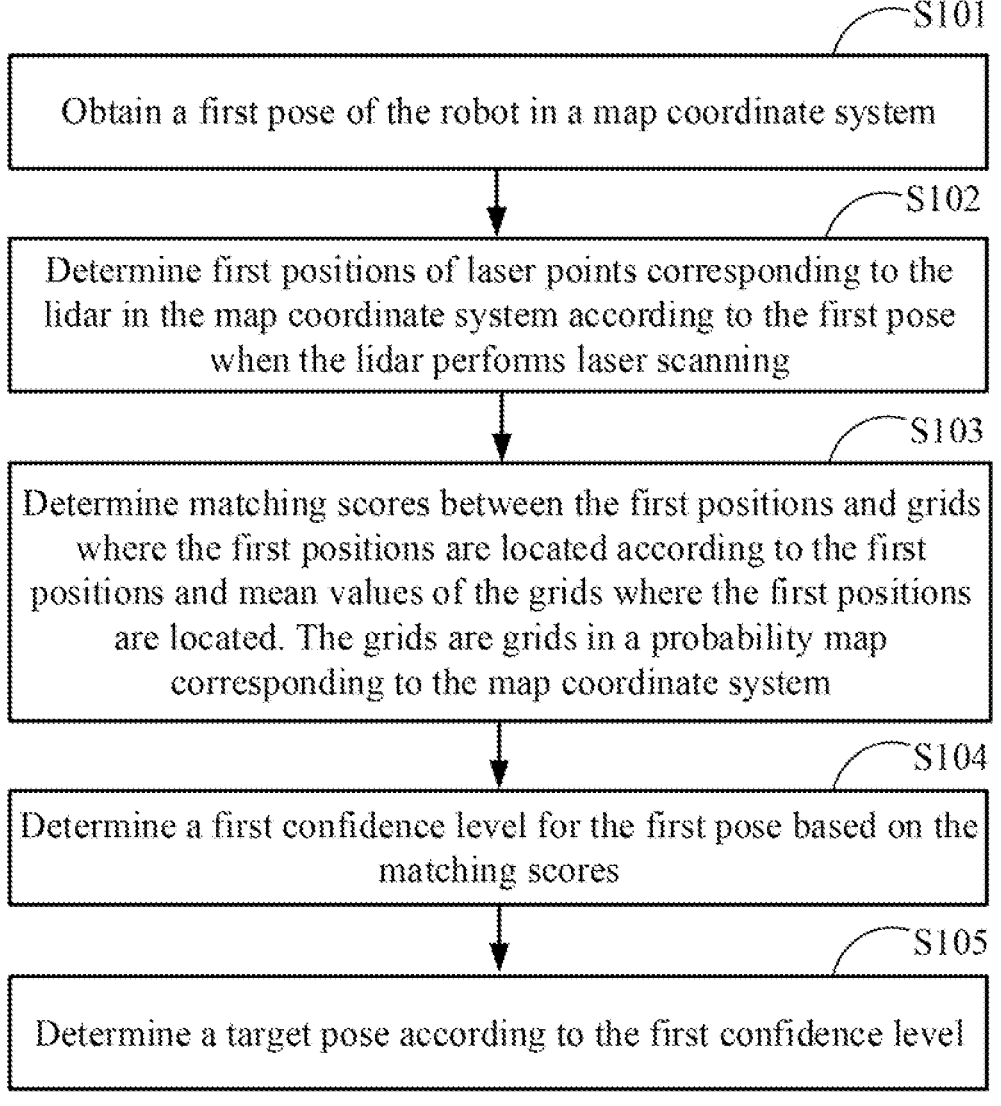

S101

Obtain a first pose of the robot in a map coordinate system

S102

Determine first positions of laser points corresponding to the lidar in the map coordinate system according to the first pose when the lidar performs laser scanning

S103

Determine matching scores between the first positions and grids where the first positions are located according to the first positions and mean values of the grids where the first positions are located. The grids are grids in a probability map corresponding to the map coordinate system

S104

Determine a first confidence level for the first pose based on the matching scores

S105

Determine a target pose according to the first confidence level

FIG. 2

METHOD FOR DETERMINING POSE OF ROBOT, ROBOT AND COMPUTER-READABLE STORAGE MEDIUM

CROSS REFERENCE TO RELATED APPLICATIONS

The present application is a continuation-application of International Application PCT/CN2021/126715, with an international filing date of Oct. 27, 2021, which claims foreign priority of Chinese Patent Application No. 202110709447.6, filed on Jun. 25, 2021 in the China National Intellectual Property Administration, the contents of all of which are hereby incorporated by reference.

TECHNICAL FIELD

The present disclosure generally relates to robots, and in particular relates to a method for determining a pose of a robot, robot and computer-readable storage medium.

BACKGROUND

During the movement of a robot (e.g., humanoid robot), relocation issues can arise. For example, when position initialization or positioning errors occur, the robot needs to be repositioned to determine the robot's pose. Some conventional methods for determining a robot's pose lack the ability to assess the determined pose, hence leading to less accurate pose determination.

Therefore, there is a need to provide a method for determining the pose of a robot to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 2 is an exemplary flowchart of a method for determining the pose of a robot according to one embodiment.

DETAILED DESCRIPTION

Figure 1:
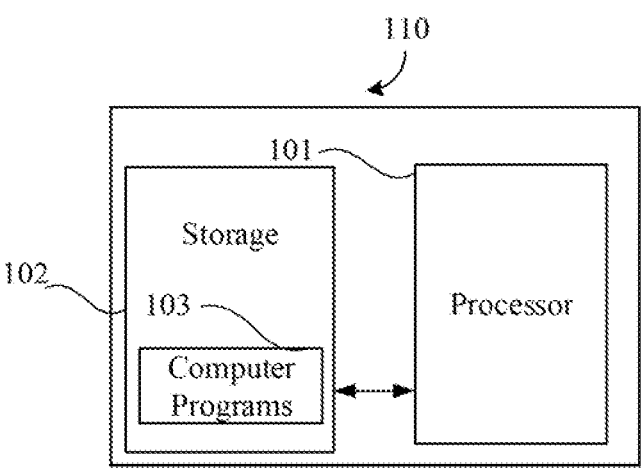
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

During the movement of a robot (e.g., humanoid robot), relocation problems are often encountered. There are two relocation methods. One is user-specified, that is, the user controls the robot to move to a fixed location. The advantage of this method is simple calculation, but it has low efficiency and many restrictions, and is rarely used in relocation problems. The other method involves automatic relocation, where the robot, through perceiving its surrounding environment, matches with a map to determine its current location. While this method is computationally complex, it boasts higher efficiency and lower costs, making it widely utilized.

One currently prevalent method for relocation is Adaptive Monte Carlo Localization (AMCL). This method uses a probability model to generate many location guesses based on the user's estimated location. Then, the method uses the optimal position guess as the estimated value, repeats the aforementioned process until the optimal position guess meets the specific criteria, and uses the optimal position guess as the final localization result. Another relocation method is the template matching method that converts the scanning information of the laser radar on the robot into machine vision information, and then performs template matching and relocation based on the visual information. After relocation based on template matching, various optimization methods can be performed based on template matching to adjust the matching results.

The relocation results from the two aforementioned relocation methods may not be accurate, requiring fine adjustments to the obtained robot pose for a more precise determination of the robot's pose.

To this end, the present disclosure provides a method for determining the pose of a robot. Specifically, the laser points generated when the robot's lidar performs scanning with the grids where the laser points are located. A first confidence level of the robot's first pose is determined based on matching scores. A target pose is determined based on the first confidence level. In this way, the first pose can be evaluated through the first confidence level, and a target pose with higher accuracy can be obtained.

The following is an exemplary description of the method for determining the pose of a robot.

The method for determining the pose of a robot according to the embodiments of the present disclosure can be executed either on a robot or on electronic devices communicating with the robot, such as smartphones, computers, tablets, etc. Taking the method executed on a robot as an example, the following describes the method for determining the pose of a robot according to the embodiments of the present disclosure.

FIG. 1 shows a schematic block diagram of a robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a method for determining the pose of a robot, such as steps S101 to S105 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EE-PROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

Figure 4:
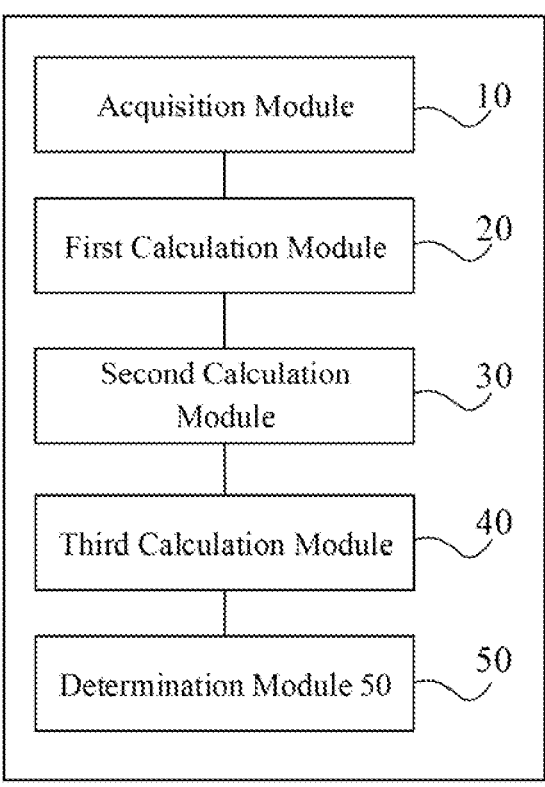
FIG. 4 is a schematic block diagram of a robot pose determination device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into an acquisition module 10, a first calculation module 20, a second calculation module 30, a third calculation module 40, and a determination module 50 as shown in FIG. 4.

It should be noted that the block diagram shown in FIG. 1 is only an example of the robot 110. The robot 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a method for determining the pose of a robot according to one embodiment. As an example, but not a limitation, the method can be implemented by the robot 110. The method may include the following steps.

Step S101: Obtain a first pose of the robot in a map coordinate system.

The map coordinate system is the coordinate system of the space where the robot is located. The x-axis and y-axis of the map coordinate system are located in the plane where the robot stands, and the z-axis of the map coordinate system is perpendicular to the plane where the robot stands. The first pose of the robot includes the position and attitude of the robot in the map coordinate system. The position of the robot in the map coordinate system is the coordinates of the robot in the map coordinate system. The coordinates can be two-dimensional coordinates, for example, including x-axis coordinates and y-axis coordinates. The coordinates can also be three-dimensional coordinates. The attitude of the robot in the map coordinate system refers to the offset angle of the robot, such as roll angle and pitch angle.

The first pose of the robot can be determined by the robot based on the surrounding environment or the most recent pose. For example, the robot can determine the locations of surrounding obstacles based on captured images or lidar scans. The robot matches the locations of the obstacles with the positions of the obstacles in the map coordinate system, determines the distances to the obstacles, and then determines the first pose based on the positions of the obstacles in the map coordinate system. For another example, after the robot restarts, it uses the pose before restarting as the first pose. The first pose of the robot can also be input by the user. For example, the robot displays a map corresponding to the map coordinate system on the robot's display interface. If the user finds that the robot is in the bedroom, selects the location of the bedroom on the map, and selects the pose of the robot, the robot will obtain the position and attitude selected by the user as the first pose.

Step S102: Determine first positions of laser points corresponding to the lidar in the map coordinate system according to the first pose when the lidar performs laser scanning.

Figure 3:
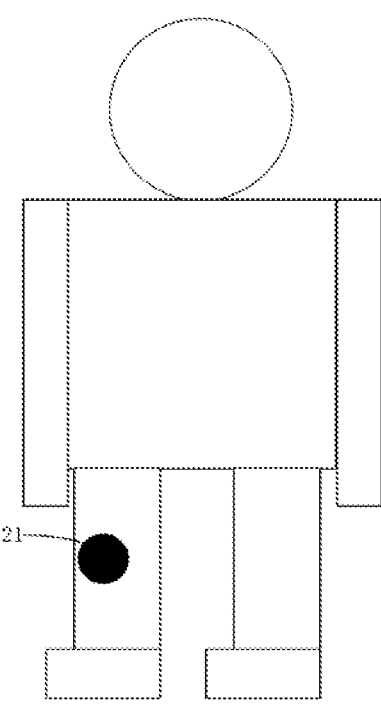
FIG. 3 is a schematic diagram of the robot according to one embodiment.

As shown in FIG. 3, a laser radar 21 is provided on the robot 110, and the laser radar 21 can emit laser light for laser scanning. After the emitted laser contacts obstacles, laser points will be formed on the obstacles. The laser radar receives the laser reflected by the obstacles. Based on the emitted laser's direction and time, along with the reflected laser's direction and time, the position of each laser point in the lidar coordinate system can be determined.

The position in the first pose of the robot is the position of the center of the robot in the map coordinate system, and the relative position between the center of the robot and the lidar is fixed. After the robot determines the first pose, it can determine the position of the lidar based on the first pose. The position of the lidar is the origin of the lidar coordinate system, and the center of the robot is the origin of the robot coordinate system. Therefore, the relationship between the lidar coordinate system and the robot coordinate system can be determined. The relationship between the robot coordinate system and the map coordinate system can be determined based on the position of the center of the robot in the map coordinate system.

After the robot determines the positions of the laser points in the lidar coordinate system, it can determine the positions of the laser points in the robot coordinate system based on the positions of the laser point in the lidar coordinate system and the relationship between the lidar coordinate system and the robot coordinate system. Then, based on the positions of the laser points in the robot coordinate system and the relationship between the robot coordinate system and the map coordinate system, the first positions of the laser points in the map coordinate system can be determined.

Step S103: Determine matching scores between the first positions and grids where the first positions are located according to the first positions and mean values of the grids where the first positions are located. The grids are grids in a probability map corresponding to the map coordinate system.

The probability map is a map determined in the map coordinate system. It can be obtained by the robot when constructing the map, or it can be obtained by converting a pre-constructed grid map. The grid map divides the space into multiple grids, and each grid corresponds to a probability. This probability represents the probability of an obstacle's presence within that grid. This probability is determined based on whether there are laser points in the corresponding grid during the laser scanning process. In the probability map, each grid corresponds to a mean and a variance. The mean and variance are determined based on the number of laser points present within the corresponding grid and the positions of these laser points during the laser scanning process. Converting the grid map into a probability map can be achieved using the Normal Distributions Transform (NDT) algorithm.

After determining the first positions of the laser points in the map coordinate system, the grids where the first positions are located can be determined based on the positions of the grids in the map coordinate system.

In one embodiment, the matching score between the first positions and the grids where the first positions are located may be calculated based on the first positions and the mean values of the grids where the first positions are located. In one embodiment, the matching score between the first positions and the grids where the first positions are located can be calculated according to the following equation:

$$\text{score}_i = \exp\left(-\frac{(X_i - q_i)^T \sum_i^{-1} (X_i - q_i)}{2}\right),$$

where $X_i$ represents the first positions, $q_i$ represents the mean values of the grids where the first positions are located, score represents the matching scores, and the matching scores range from 0 to 1. "T" represents the transpose operation, $$\text{"} \sum_{}^{-1} \text{"}$$

denotes covariance operation, and "exp" stands for exponential operation. The first positions may be in the form of a two-dimensional vector, for example, including the x-axis coordinates and the y-axis coordinates corresponding to the first positions. The first positions may also be in the form of a three-dimensional vector, for example, including the x-axis coordinates, y-axis coordinates, and z-axis coordinates corresponding to the first positions. If the first positions are in the form of a two-dimensional vector, the mean values of the grids where the first positions are located are in the form of a two-dimensional vector formed by the corresponding coordinates. If the first positions are in the form of a three-dimensional vector, the mean values of the grids where the first positions are located are in the form of a three-dimensional vector formed by the corresponding coordinates.

In one embodiment, the differences between the first positions and the mean values of the grids where the first positions are located can be used as the matching scores between the first positions and the grids where the first positions are located. In another embodiment, the matching scores between the first positions and the grids where the first positions are located may also be calculated based on the variances between the first positions and the grids where the first positions are located.

Step S104: Determine a first confidence level for the first pose based on the matching scores.

In one embodiment, the number of laser radars installed on the robot is one, and the matching score calculated based on the first positions is the first confidence level of the first pose. In another embodiment, when laser scanning is performed, the number of formed laser points is at least two. The at least two laser points may be obtained by a single laser radar emitting laser beams at least twice, and the two laser emission directions are different. Alternatively, the at least two laser points may also be obtained by at least two laser radars emitting laser beams respectively. For example, the number of lidars installed on the robot is at least two. When the robot performs laser scanning, each lidar emits laser light. When the emitted laser light contacts an obstacle, it will form a laser point on the obstacle. Therefore, the number of corresponding laser points is at least two. The robot calculates a matching score corresponding to each first position based, and uses the average of at least two matching scores as the first confidence level of the first pose. For example, the number of lidars is five, the number of corresponding laser points is five, and the matching scores corresponding to the five laser points are 1, 0.8, 0, 0.2, and 0.5, respectively. The average the five matching scores is 0.5, and the first confidence level is 0.5.

Step S105: Determine a target pose according to the first confidence level.

In one embodiment, if the first confidence level is greater than or equal to a preset value, the first pose is used as the target pose. If the first confidence level is less than the preset value, the pose of the robot is adjusted based on the first pose until a pose with a confidence level greater than or equal to the preset value is obtained, and the pose is determined as the target pose.

In one embodiment, after obtaining the first confidence level of the first pose, the first pose is adjusted within an adjustment range to obtain at least one second pose. For each second pose, when the robot is in the second pose, the robot's lidar performs laser scanning and the positions of the laser points obtained in the lidar coordinate system are calculated. Then, based on the positions of the laser points in the lidar coordinate system and the relationship between the map coordinate system and the lidar coordinate system, the second positions of the laser points in the map coordinate system are determined. Then, based on the second positions and the matching scores of the grids where the second positions are located, the second confidence levels of the second poses are determined. There are multiple second poses, and there are multiple corresponding second confidence levels. After obtaining multiple second confidence levels, the second position with the highest second confidence level is used as the target pose, thereby improving the accuracy of the determined target pose. In one embodiment, after the multiple second confidence levels are calculated, the first confidence level is compared with the second confidence levels. If there is one or more second confidence levels greater than the first confidence level, then the second position with the highest second confidence level is used as the target pose. If there is no second confidence level greater than the first confidence level, the first pose is used as the target pose.

In one embodiment, the adjustment range is determined based on the first confidence level. For example, if the first confidence level is less than a preset value, it means that the accuracy of the first pose is low, then a first range is used as the adjustment range. If the first confidence level is greater than the preset value, it means that the accuracy of the first posture is higher. Then a second range is used as the adjustment range, and the second range is smaller than the first range. That is, if the accuracy of the first posture is low, the first pose will be adjusted within a large adjustment range; if the accuracy of the first pose is high, the first pose will be adjusted within a small adjustment range. As a result, the calculation speed can be increased and the target pose can be obtained swiftly.

In another embodiment, the adjustment range is predefined. For example, the adjustment range includes an adjustment range in the x-axis direction, an adjustment range in the y-axis direction, and an angle adjustment range. The adjustment range in the x-axis direction and the y-axis direction are both ±1 cm, and the angle adjustment range is ±1 degree. For example, if the first pose is a vector (0,0,0), where the three elements in the vector are the x-axis coordinate, y-axis coordinate and angle of the position of the robot, the second poses obtained based on the adjustment range includes 27 different poses formed by combinations such as (1, 0, 0), (1, 1, 0), (1, −1, 0), (−1, 1, 0), (1, 1, −1), etc.

In one embodiment, after the second pose with the highest confidence level is determined, a preset algorithm can be used to optimize the second pose with the highest confidence level to obtain at least one optimized third pose. For each third pose, when the robot is in the third pose, the lidar of the robot performs laser scanning and the positions of the laser points obtained in the lidar coordinate system are calculated. Then, based on the positions of the laser points in the lidar coordinate system and the relationship between the map coordinate system and the lidar coordinate system, the third positions of the laser points in the map coordinate system are determined. Then, the third confidence levels of the third poses are determined based on the matching scores between the third positions and the grids where the third positions are located. There are multiple third poses, and there are multiple corresponding third confidence levels. After the multiple third confidence levels are obtained, the third pose with the highest third confidence level is used as the target pose, which further improves the accuracy of the obtained target pose.

In one embodiment, the algorithm is a Gauss-Newton iterative matching algorithm. During the algorithm's runtime, with each iteration, one third pose is obtained, and the corresponding confidence level for the third pose is calculated. After the third confidence level is obtained in each iteration, the third confidence level obtained in the current iteration is compared with the third confidence level obtained in the previous iteration. If the third confidence level obtained in the current iteration is greater than or equal to the third confidence level obtained in the previous iteration, the iteration will be continued. If the third confidence level obtained in the current iteration is less than the third confidence level obtained in the previous iteration, the third confidence level obtained in the previous iteration is regarded as the highest third confidence level, and the third pose obtained in the previous iteration is determined as the target pose. Using the Gauss-Newton iterative matching algorithm can improve the computation speed and the accuracy of the calculated target pose.

The Gaussian-Newton iterative algorithm performs iterative optimization through the Hessian matrix. Specifically, the difference between the third positions of the laser points corresponding to the third poses in the map coordinate system and the mean values of the grids where the third positions are located is used as the error function. The Jacobian matrix corresponding to the laser points can be obtained by finding the derivative of the error function. For the third pose, each laser point corresponds to a Jacobian matrix. The Jacobian matrices of all laser points corresponding to the third poses are added together to obtain the summed Jacobian matrix. The Hessian matrix is calculated based on the summed Jacobian matrix. After the third pose is obtained in each iteration, the third pose obtained in the next iteration is determined based on the value of the Hessian matrix obtained in the current iteration. After the third pose is obtained in each iteration, the corresponding third confidence level is calculated, and the third confidence level obtained in the current iteration is compared with the third confidence level obtained in the previous iteration. If the third confidence level obtained in the current iteration is greater than the third confidence level obtained in the previous iteration, the iteration will be continued. If the third confidence level obtained in the current iteration is less than the third confidence level obtained in the previous iteration, the third confidence level obtained in the previous iteration will be determined as the highest third confidence level, and third pose obtained in the previous iteration is determined as the target pose.

In another embodiment, during the runtime of the Gauss-Newton iteration algorithm, the iteration may be continued after obtaining the third pose and calculating the corresponding third confidence level in each iteration until reaching the maximum iteration count, at which point the iteration terminates. After the iteration is terminated, the third pose with the highest confidence is determined from the third poses obtained in each iteration, and the third pose with the highest confidence is the target pose.

In another embodiment, optimization of the third pose to obtain the target pose can be achieved using iterative algorithms like simulated annealing optimization, gradient-based optimization, and similar approaches.

In one embodiment, after the first confidence level is obtained, if the first confidence level is greater than a preset value, it means that the accuracy of the first pose is relatively high, and the target pose will be determined based on the first pose. If the first confidence level is less than the preset value, it means that the accuracy of the first pose is low. If the pose is adjusted based on the first pose, it will not be easy to obtain the target pose. In this case, it needs to obtain the updated first pose. For example, if the first pose is input by a user, a prompt to input a new pose can be output on the display interface of the robot. For another example, if the first pose is obtained after initialization of the robot, the robot will be re-initialized to obtain the updated first pose. After the updated first pose is obtained, the first positions of the corresponding laser points in the map coordinate system are determined when laser scanning is performed when the robot is in the updated first pose. The first confidence level of the updated first pose according to the matching scores between the first positions and the grids where the first positions are located until the first confidence level that is greater than or equal to the preset value is obtained. The target pose is determined based on the updated first pose corresponding to the first confidence level, thereby preventing blind optimization of the pose during the localization process, thereby improving the computational speed.

In summary, in the aforementioned embodiments, the first pose of the robot is first obtained, and the first positions of the laser points of the lidar in the map coordinate system are determined based on the first pose. The matching scores between the first positions and the grids where the first positions are located are then determined. The first confidence level of the first pose is then determined based on the matching scores. Then, the target pose is determined based on the first confidence level, so that the first pose can be evaluated according to the first confidence level, and a target pose with higher accuracy can be obtained.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 4, in one embodiment, a robot pose determination device includes an acquisition module 10, a first calculation module 20, a second calculation module 30, a third calculation module 40, and a determination module 50. The acquisition module 10 is to obtain a first pose of the robot in a map coordinate system. The first calculation module 20 is to determine first positions of laser points corresponding to the lidar in the map coordinate system according to the first pose when the lidar performs laser scanning. The second calculation module 30 is to determine matching scores between the first positions and grids where the first positions are located according to the first positions and mean values of the grids where the first positions are located. The grids are grids in a probability map corresponding to the map coordinate system. The third calculation module 40 is to determine a first confidence level for the first pose based on the matching scores. The determination module 50 is to determine a target pose according to the first confidence level.

In one embodiment, the second calculation module 30 is further to determine the matching scores between the first positions and the grids where the first positions are located according to the first positions and the mean values of the grids where the first positions are located.

In one embodiment, the number of the laser points is at least two and the number of the matching scores is at least two. The third calculation module 40 is further to use an average of the at least two matching scores as the first confidence level for the first pose.

In one embodiment, the determination module 50 is further to: adjust the first pose within an adjustment range to obtain at least one second pose; determine a second confidence level for each of the at least one second pose; and determine the target pose based on one of the at least one the second pose with a largest one of the second confidence levels.

In one embodiment, the determination module 50 is further to: optimize the one of the at least one the second pose with the largest one of the second confidence levels using a preset algorithm to obtain at least one optimized third pose; determine a third confidence level for each of the at least one third pose; and determine one of the at least one third pose with a largest one of the third confidence levels as the target pose.

In one embodiment, the determination module 50 is further to determine the adjustment range based on the first confidence level.

In one embodiment, the determination module 50 is further to obtain an updated first pose if the first confidence level is less than a preset value and determine the target pose based on the updated first pose.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for determining a pose of a robot comprising a lidar, comprising:

obtaining a first pose of the robot in a map coordinate system;

determining first positions of laser points corresponding to the lidar in the map coordinate system according to the first pose when the lidar performs laser scanning;

determining matching scores between the first positions and grids where the first positions are located, according to coordinates of the first positions and mean values of the grids where the first positions are located, wherein the grids are grids in a probability map corresponding to the map coordinate system;

determining a first confidence level for the first pose based on the matching scores; and determining a target pose according to the first confidence level;

wherein determining the target pose according to the first confidence level comprises:

adjusting the first pose within an adjustment range to obtain second poses;

determining a second confidence level for each of the second poses; and determining the target pose based on one of the second poses with a largest one of the second confidence levels.

2. The method of claim 1, wherein a number of the laser points is at least two and a number of the matching scores is at least two; determining the first confidence level for the first pose based on the matching scores comprises:

using an average of the at least two matching scores as the first confidence level for the first pose.

3. The method of claim 1, wherein determining the target pose based on one of the second poses with the largest one of the second confidence levels comprises:

optimizing the one of the second poses with the largest one of the second confidence levels using a preset algorithm to obtain optimized third poses;

determining a third confidence level for each of the third poses; and determining one of the third poses with a largest one of the third confidence levels as the target pose.

4. The method of claim 1, further comprising, before adjusting the first pose within the adjustment range to obtain the second poses, determining the adjustment range based on the first confidence level.

5. The method of claim 4, wherein determining the adjustment range based on the first confidence level comprises:

when the first confidence level is less than a preset value, using a first range as the adjustment range; and when the first confidence level is greater than the preset value, using a second range as the adjustment range, wherein the second range is smaller than the first range.

6. The method of claim 1, wherein determining the target pose according to the first confidence level comprises:

obtaining an updated first pose if the first confidence level is less than a preset value; and determining the target pose based on the updated first pose.

7. The method of claim 1, wherein each grid in the probability map corresponds to the mean value and a variance, and the mean value and the variance of each grid are determined based on a number of laser points present within the corresponding grid and positions of the laser points present within the corresponding grid during a laser scanning process.

8. The method of claim 7, wherein the coordinate of the first position is a two-dimensional vector comprising an x-axis coordinate and a y-axis coordinate of the first position, and the mean value of the grid where the first position is located is a two-dimensional vector formed by coordinates corresponding to the grid where the first position is located; or wherein the coordinate of the first position is a three-dimensional vector comprising the x-axis coordinate, the y-axis coordinate, and a z-axis coordinate corresponding to the first position, and the mean value of the grid where the first position is located is a three-dimensional vector formed by coordinates corresponding to the grid where the first position is located.

9. The method of claim 8, wherein the matching scores between the first positions and the grids where the first positions are located are calculated according to the following equation:

$$\text{score}_i = \exp\left(-\frac{(X_i - q_i)^{\mathrm{T}} \sum_i^{-1} (X_i - q_i)}{2}\right),$$

where $X_i$ represents the first positions, $q_i$ represents the mean values of the grids where the first positions are located, score$_i$ represents the matching scores, and the matching scores range from 0 to 1, T represents transpose operation, $$\sum{}^{-1}$$

denotes covariance operation, and exp stands for exponential operation.

10. The method of claim 8, wherein determining the matching scores between the first positions and the grids where the first positions are located comprises:

calculating and using differences between the coordinates of the first positions and the mean values of the grids where the first positions are located as the matching scores.

11. A robot comprising:

one or more processors;

one or more lidars electrically coupled to the one or more processors; and a memory coupled to the one or more processors, the memory storing programs that, when executed by the one or more processors, cause performance of operations comprising:

obtaining a first pose of the robot in a map coordinate system;

determining first positions of laser points corresponding to the one or more lidars in the map coordinate system according to the first pose when the one or more lidars performs laser scanning;

determining matching scores between the first positions and grids where the first positions are located, according to coordinates of the first positions and mean values of the grids where the first positions are located, wherein the grids are grids in a probability map corresponding to the map coordinate system;

determining a first confidence level for the first pose based on the matching scores; and determining a target pose according to the first confidence level;

wherein determining the target pose according to the first confidence level comprises:

adjusting the first pose within an adjustment range to obtain second poses;

determining a second confidence level for each of the second poses; and determining the target pose based on one of the second poses with a largest one of the second confidence levels.

12. The robot of claim 11, wherein a number of the laser points is at least two and a number of the matching scores is at least two; determining the first confidence level for the first pose based on the matching scores comprises:

using an average of the at least two matching scores as the first confidence level for the first pose.

13. The robot of claim 11, wherein determining the target pose based on one of the second poses with the largest one of the second confidence levels comprises:

optimizing the one of the second poses with the largest one of the second confidence levels using a preset algorithm to obtain optimized third poses;

determining a third confidence level for each of third poses; and determining one of the third poses with a largest one of the third confidence levels as the target pose.

14. The robot of claim 11, further comprising, before adjusting the first pose within the adjustment range to obtain the second poses, determining the adjustment range based on the first confidence level.

15. The robot of claim 11, wherein determining the target pose according to the first confidence level comprises:

obtaining an updated first pose if the first confidence level is less than a preset value; and determining the target pose based on the updated first pose.

16. A non-transitory computer-readable storage medium storing instructions that, when executed by at least one processor of a robot that comprises one or more lidars, cause the at least one processor to perform a method, the method comprising:

obtaining a first pose of the robot in a map coordinate system;

determining first positions of laser points corresponding to the lidar in the map coordinate system according to the first pose when the lidar performs laser scanning;

determining matching scores between the first positions and grids where the first positions are located, according to coordinates of the first positions and mean values of the grids where the first positions are located, wherein the grids are grids in a probability map corresponding to the map coordinate system;

determining a first confidence level for the first pose based on the matching scores; and determining a target pose according to the first confidence level;

wherein determining the target pose according to the first confidence level comprises:

adjusting the first pose within an adjustment range to obtain second poses;

determining a second confidence level for each of the second poses; and determining the target pose based on one of the second poses with a largest one of the second confidence levels.

17. The non-transitory computer-readable storage medium of claim 16, wherein a number of the laser points is at least two and a number of the matching scores is at least two; determining the first confidence level for the first pose based on the matching scores comprises:

using an average of the at least two matching scores as the first confidence level for the first pose.

18. The non-transitory computer-readable storage medium of claim 16, wherein determining the target pose based on one of the second poses with the largest one of the second confidence levels comprises:

optimizing the one of the second poses with the largest one of the second confidence levels using a preset algorithm to obtain optimized third poses;

determining a third confidence level for each of the third poses; and determining one of the third poses with a largest one of the third confidence levels as the target pose.

19. The non-transitory computer-readable storage medium of claim 16, further comprising, before adjusting the first pose within the adjustment range to obtain the second poses, determining the adjustment range based on the first confidence level.

20. The non-transitory computer-readable storage medium of claim 16, wherein determining the target pose according to the first confidence level comprises:

obtaining an updated first pose if the first confidence level is less than a preset value; and determining the target pose based on the updated first pose.

* * * * *